(12) United States Patent
Duran et al.

(10) Patent No.: US 7,164,664 B2
(45) Date of Patent: Jan. 16, 2007

(54) METHOD AND SYSTEM FOR ALLOCATING A CARRIER FREQUENCY IN A RADIO COMMUNICATION SYSTEM

(75) Inventors: Alfonso Fernandez Duran, Madrid (ES); Francisco Escrihuela Langa, Madrid (ES)

(73) Assignee: Alcatel, Paris (FR)

( * ) Notice: Subject to any disclaimer, the term of this patent is extended or adjusted under 35 U.S.C. 154(b) by 897 days.

(21) Appl. No.: 09/998,423

(22) Filed: Dec. 3, 2001

(65) Prior Publication Data

US 2002/0067703 A1 Jun. 6, 2002

(30) Foreign Application Priority Data

Dec. 4, 2000 (ES) ................. 200002903

(51) Int. Cl.
*H04Q 7/00* (2006.01)
(52) U.S. Cl. ...................... 370/329; 370/341
(58) Field of Classification Search ............... 370/329, 370/203, 343, 341
See application file for complete search history.

(56) References Cited

U.S. PATENT DOCUMENTS 5,937,002 A * 8/1999 Andersson et al. ......... 375/131
6,223,031 B1 * 4/2001 Naslund ..................... 455/423

\* cited by examiner

*Primary Examiner*—Ahmad Matar
(74) *Attorney, Agent, or Firm*—Sughrue Mion, PLLC

(57) ABSTRACT

System that allocates a carrier frequency to a radio link, for transmitting data bursts between a remote unit and a fixed unit, by employing orthogonal frequency division multiplexing OFDM. The fixed unit records a predetermined number of parameters relative to the communication in course, for the purpose of weighting said parameters, such as number of errors in the radio link and number of retransmissions or the like, and allocates to these parameters a probability level. The fixed unit allocates a probability level to each carrier frequency, so that it responds to a communication set-up request allocating the carrier frequency with the highest probability.

3 Claims, 3 Drawing Sheets

METHOD AND SYSTEM FOR ALLOCATING A CARRIER FREQUENCY IN A RADIO COMMUNICATION SYSTEM

OBJECT OF THE INVENTION

The present invention relates to a method for selecting a carrier frequency from among a bank of carrier frequencies. The carrier frequency selected is allocated to a communication that is set up between a fixed unit and a remote unit of a radiocommunication system.

The method of the invention is of special application, but not exclusively, in radiocommunication systems in which the remote unit is connected to a local area network (LAN), and employs orthogonal frequency division multiplexing (OFDM) in order to communicate with the fixed unit.

STATE OF THE ART

A system is known in the state of the art that uses spread spectrum techniques with frequency hopping for communications via radio between at least one fixed unit and a set of remote units, in which at least one of them is connected to a local area network (LAN), through the U.S. Pat. No. 5,923,702 "Frequency hopping cellular LAN system", granted to Brenner et al., and incorporated in the present patent application by reference.

The system includes a set of access points that are capable of setting up communications with at least one station using spread spectrum techniques with frequency hopping.

A first access point and a second access point utilise, respectively, a predetermined sequence of frequencies for setting up communications with a plurality of stations.

When a communication between a station and one of the access points is set up, for example the first access point on a carrier frequency, it is possible that the same carrier frequency is being used in another communication by another station and the second access point. This situation produces interference by one communication in the other, and vice versa.

To avoid the interfering signal, each access point orders periodic frequency hops, with the object of utilising other frequencies of the frequency subset that the access point uses.

The access point, to order the hop from one frequency to another frequency establishes a predetermined pseudo-random frequency hopping sequence. To establish the frequency hopping sequence, the access point takes into account the result of a set of measurements that it carries out during the course of each communication. Thus, it measures the C/I quality signal, the level of interference or the like, on the frequency and/or frequencies utilised during each communication.

The measurements are made in both transmission directions, that is, in the downlink direction and in the uplink direction. Therefore at least one access point and one remote station participate in the measurements.

With the result of the measurements made, the system is capable of mapping a table that compiles the characteristics of each frequency suitable for being allocated to a communication. As a consequence, the fixed unit is able to predict, beforehand, the behaviour of the frequency allocated to the communication.

A drawback of this procedure is that the measurements can be made when the kind of data transmitted is sufficiently long and stable, such as during a telephone call.

However, when the nature of the information bearing data transmitted does not correspond to long and stable data streams, such as IP (Internet Protocol) traffic characterised by being in bursts of variable and unforeseeable size, it is not possible to make the aforementioned measurements and, therefore, predicting the behaviour of the radio link is not feasible.

Consequently, the above method of carrier frequency allocation turns out to be fairly ineffective when data packets are transmitted in bursts of a variable and unforeseeable size.

Hence, it is necessary to develop a method of allocating carrier frequencies that guarantees a minimum C/I quality and interference for a radio link,: and that avoids having to take measurements in both transmission directions.

CHARACTERISATION OF THE INVENTION

An object of the invention is to select a frequency from among a set of carrier frequencies without taking measurements of parameters such as interference level, quality signal, etc. Consequently, there is no need to make measurements in both transmission directions and, as a result, it is not necessary that the data packets have a minimum duration.

The method of the invention for allocating a carrier frequency in a radiocommunication system in which data bursts are transmitted between a remote unit and a fixed unit, using orthogonal frequency division multiplexing OFDM, records a predetermined number of parameters relative to the communication in course, for the purpose of weighting said parameters, such as number of errors in the radio link, number of retransmissions or the like, and allocates to these parameters a probability level.

When the fixed unit has allocated a probability level to each carrier frequency, it responds to a communication set-up request allocating the carrier frequency with the highest probability.

BRIEF DESCRIPTION OF THE DRAWINGS

A fuller explanation of the invention is given in the following description, based on the figures attached, in which.

DESCRIPTION OF THE INVENTION

To proceed with the description in detail of an embodiment of the present invention reference shall be made to the figures in the attached drawings, with the aim of facilitating the better understanding of the description.

Figure 1:
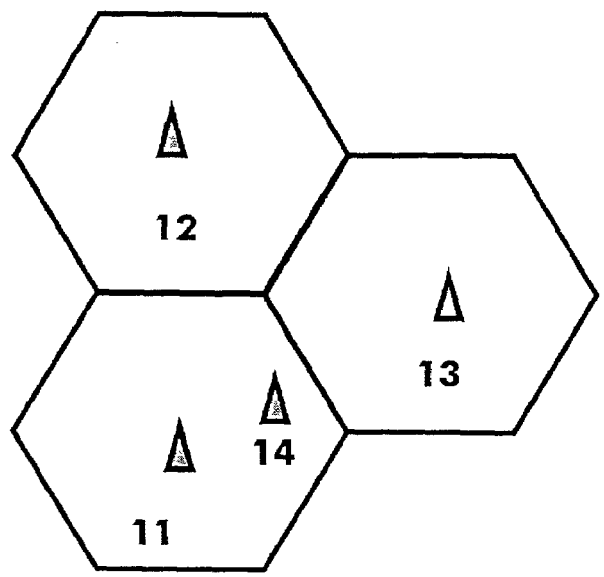
FIG. 1 shows, in a block diagram, a preferred embodiment of a radiocommunication system according to the invention.

FIG. 1 shows a radiocommunication system that comprises a plurality of fixed units, of which fixed units 11, 12 and 13 are shown. Each one of them has a radio interface with which it is capable of setting up radio communications using orthogonal frequency division multiplexing OFDM with a set of remote units, of which remote unit 14, located within the area of coverage of fixed unit 11, is shown. Each remote unit, in turn, has a radio transmitter-receiver respectively.

Fixed unit 11 is capable of setting up communications on a subset of frequencies, for example, from frequency f1 to frequency f6.

Figure 4:
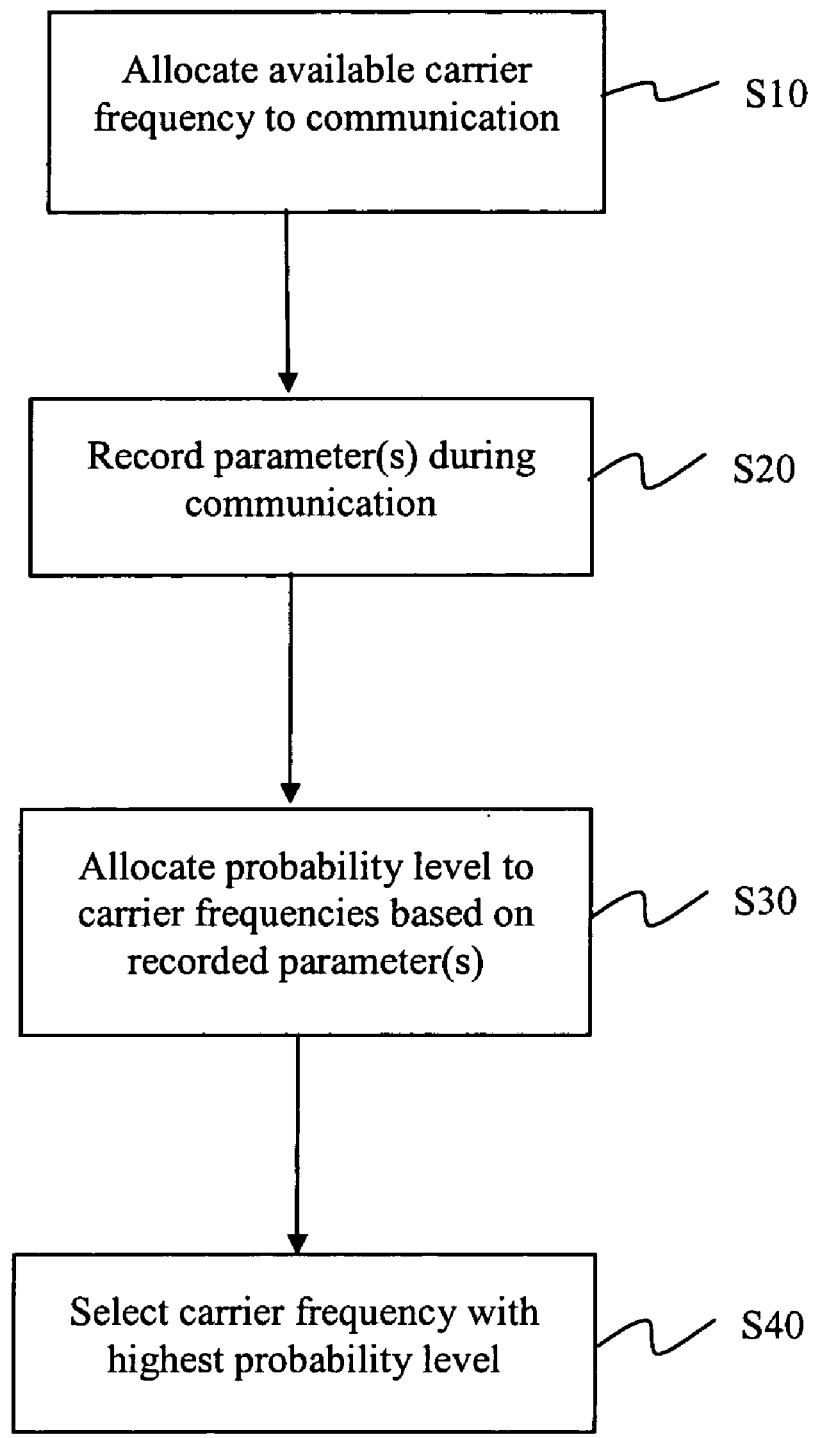
FIG. 4 shows a flowchart of a method according to an exemplary embodiment of the invention.

During normal operation of the system, when remote unit 14 has at least one data packet to transmit, it transmits to fixed unit 11 an access request, with the object that fixed unit 11 allocates an available carrier frequency to the communication that it is wished to initiate (S10 of FIG. 4).

Figure 2:
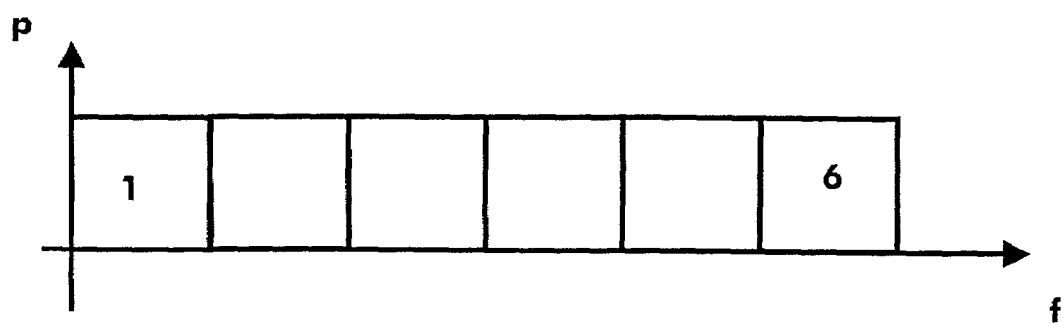
FIG. 2 shows the probability distribution function at an initial instant, according to the invention.

By way of example, in FIG. 2 a probability distribution function is shown, according to which each of the frequencies f1 to f6 has, initially, the same probability of being allocated to the radio link by fixed unit 11. Hence the probability distribution function is a uniform distribution.

Fixed unit 11 is capable of selecting at random a frequency, for example carrier frequency f1, and of allocating it to the radio link in order that the communication takes place on the aforementioned frequency f1.

As the transmission progresses, fixed unit 11 is capable of registering events that occur during the time that the communication is in course on the aforementioned frequency f1, such as number of errors that are produced, number of retransmissions or the like (S20 of FIG. 4).

With said information, fixed unit 11 is capable of establishing a weighting for each of the predetermined parameters, for the purpose of changing the probability of frequency f1 or other frequencies on which the commumcation takes place (S30 of FIG. 4).

Thus, when fixed unit 11 has to make a frequency hop, that is, allocate another carrier frequency, it selects that frequency which has the highest probability, since it has a lower level of interference, fewer retransmissions, better C/I signal quality or the like (S40 of FIG. 4).

As has been mentioned, all the carrier frequencies have initially, at the moment of triggering the cell of fixed unit 11, the same probability of being selected for frequency hopping.

However, as successive communications develop, fixed unit 11 progressively alters the probability of each of the carrier frequencies f1 to f6, in such a manner that over time the probabilities of the frequencies f1 to f6 increase and/or diminish, according to the record of events occurring in each communication.

Figure 3:
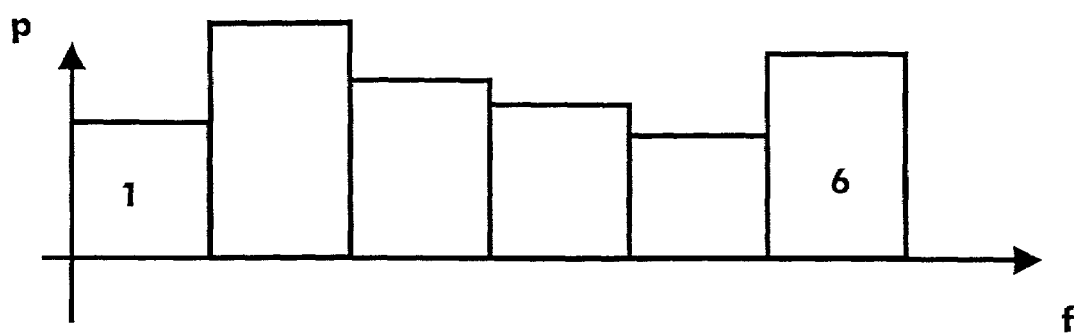
FIG. 3 shows the probability distribution function at an instant other than the initial instant according to the invention.

After a period of time with the cell of fixed unit 11 in operation, it is possible to encounter a probability function like that shown in FIG. 3.

In the event that during the transmission no errors are produced, there are no requests for retransmission, etc., fixed unit 11 weights the selected frequency in the sense of increasing its probability, for the purpose of selecting it for a new communication, before another carrier frequency with lower probability.

As has already been mentioned, initially the fixed unit 11 allocates an equal probability level to each of the frequencies f1 to f6, and according to the evolution of the successive communications, performs successive carrier frequency selection orderings on a basis of the successive levels of probability.

The method of the invention is independent of the kind of information transmitted, that is, of the size of the data packets or whether these are transmitted in bursts or in continuous mode, since no measurements are made, in either transmission direction, whilst the radio link is established.

Generally, the system has the weighting parameters available; thus, all what has to be done is to maintain a record of them. For example, when there is an error in a packet its retransmission is requested, therefore the functionality of keeping a record of the number of retransmissions that are made in each communication is added.

Likewise, the method of the invention is capable of adapting to the surrounding radiofrequency conditions, that is, if a cell is divided into at least two cells, the fixed units quickly know which are the most appropriate carrier frequencies on which to set up radio links in their respective cells. Therefore, the radiocommunication system avoids frequency planning and adapts dynamically to traffic conditions continuously.

The invention claimed is:

1. A method for allocating a carrier frequency in a radiocommunication system in which data bursts are transmitted between a remote unit and a fixed unit, the method comprising:
   recording a number of predetermined parameters which occur during a communication between the remote unit and the fixed unit;
   allocating a probability level to each of a plurality of carrier frequencies allocated to a communication, on the basis of weighting of the recorded parameters; and
   selecting a carrier frequency, from among the plurality of carrier frequencies, which has a highest probability level to be allocated to a communication,
   wherein the predetermined parameters comprise at least one of errors that are produced during the communication and retransmissions during the communication.

2. A system for allocating a radio channel in a wireless communication system, the system comprising:
   a remote unit; and
   a fixed unit configured to record a number of predetermined parameters which occur during a communication in which data bursts are transmitted between the remote unit and the fixed unit, allocate a probability level to each of a plurality of carrier frequencies allocated to a communication on the basis of weighting of the recorded parameters, and select a carrier frequency, from among the plurality of carrier frequencies, which has a highest probability level to be allocated to a communication,
   wherein the predetermined parameters comprise at least one of errors that are produced during the communication and retransmissions during the communication.

3. A fixed unit of a wireless communication system, the fixed unit being configured to record a number of predetermined parameters which occur during a communication in which data bursts are transmitted between a remote unit and the fixed unit, allocate a probability level to each of a plurality of carrier frequencies allocated to a communication on the basis of weighting of the recorded parameters, and select a carrier frequency, from among the plurality of carrier frequencies, which has a highest probability level to be allocated to a communication,
   wherein the predetermined parameters comprise at least one of errors that are produced during the communication and retransmissions during the communication.

* * * * *